US012585695B2

(12) United States Patent (10) Patent No.: US 12,585,695 B2

Ontra et al. (45) Date of Patent: Mar. 24, 2026

(54) MAKING COMMUNICATIONS MORE EFFECTIVE THROUGH SLIDE TRACKING

(71) Applicant: Shufflrr LLC, West Palm Beach, FL (US)

(72) Inventors: AlexAnndra Ontra, West Palm Beach, FL (US); James Ontra, West Palm Beach, FL (US)

(73) Assignee: Shufflrr LLC, West Palm Beach, FL (US)

( * ) Notice: Subject to any disclaimer, the term of this patent is extended or adjusted under 35 U.S.C. 154(b) by 0 days.

(21) Appl. No.: 18/387,379

(22) Filed: Nov. 6, 2023

(65) Prior Publication Data

US 2024/0152547 A1 May 9, 2024

Related U.S. Application Data

(60) Provisional application No. 63/422,671, filed on Nov. 4, 2022.

(51) Int. Cl.
*G06F 16/55* (2019.01)

(52) U.S. Cl.
CPC .................................... *G06F 16/55* (2019.01)

(58) Field of Classification Search
None
See application file for complete search history.

(56) References Cited

U.S. PATENT DOCUMENTS

| | | | | |
|---|---|---|---|---|
| 8,281,245 | B1 * | 10/2012 | Bennett ............... | G06F 16/4393 |
| | | | | 706/46 |
| 10,460,023 | B1 * | 10/2019 | Shriver ................. | G06F 40/117 |
| 10,656,814 | B2 * | 5/2020 | Lindley ............... | G06F 3/04847 |
| 11,971,923 | B2 * | 4/2024 | Hasan ..................... | G06F 16/51 |
| 2004/0205347 | A1 * | 10/2004 | Erol ........................ | G06F 16/84 |
| | | | | 713/178 |
| 2006/0294469 | A1 * | 12/2006 | Sareen ................ | G06F 16/4393 |
| | | | | 707/E17.143 |
| 2013/0316324 | A1 * | 11/2013 | Hoffmann ................ | G09B 7/00 |
| | | | | 434/362 |
| 2014/0164285 | A1 * | 6/2014 | Ashburn ................ | G06Q 40/06 |
| | | | | 705/36 R |
| 2014/0172822 | A1 * | 6/2014 | Miller .................... | H02B 11/24 |
| | | | | 707/713 |
| 2014/0282013 | A1 * | 9/2014 | Amijee .................. | G06F 3/0482 |
| | | | | 715/732 |
| 2015/0177964 | A1 * | 6/2015 | Spirer ................. | G06F 16/4393 |
| | | | | 715/732 |
| 2016/0034121 | A1 * | 2/2016 | High ...................... | G06F 3/0481 |
| | | | | 715/730 |
| 2016/0110036 | A1 * | 4/2016 | Baumgartner ...... | H04L 67/1095 |
| | | | | 715/741 |
| 2018/0268253 | A1 * | 9/2018 | Hoffman .............. | G06V 10/761 |
| 2019/0087786 | A1 * | 3/2019 | Gough ..................... | G07C 1/10 |

(Continued)

*Primary Examiner* — Khanh B Pham
*Assistant Examiner* — Navneet Gmahl
(74) *Attorney, Agent, or Firm* — Older and Lundy, LLC; Thomas Stanton; Eric Kleinertz

(57) ABSTRACT

The invention relates to a system that allows a user to pull slides from a corporate slide library that has individual slides for every issue: who you are, what you do, how you do it, why you do it. The system allows the user to read and react to your client's needs on the fly with valued documentation that is part of the corporate library and contains ratings with respect to the effectiveness of the slide.

18 Claims, 6 Drawing Sheets

(56) References Cited

U.S. PATENT DOCUMENTS

| 2019/0122149 | A1* | 4/2019 | Caldera | H04L 63/102 |
| 2020/0021453 | A1* | 1/2020 | Advani | H04H 60/33 |
| 2020/0143427 | A1* | 5/2020 | Hailpern | H04L 51/10 |
| 2020/0272963 | A1* | 8/2020 | Chait | G06Q 10/0635 |
| 2022/0131844 | A1* | 4/2022 | Sherlock | H04L 63/105 |
| 2022/0358261 | A1* | 11/2022 | Weidmann | G06Q 30/0283 |
| 2023/0083444 | A1* | 3/2023 | Yao | G06F 16/3326 |
| | | | | 715/254 |
| 2024/0005244 | A1* | 1/2024 | Vangala | G06Q 10/0633 |
| 2024/0126981 | A1* | 4/2024 | Shahinian | G06F 40/40 |

* cited by examiner

MAKING COMMUNICATIONS MORE EFFECTIVE THROUGH SLIDE TRACKING

CROSS-REFERENCE TO RELATED APPLICATIONS

"This application claims the benefit of U.S. Provisional Patent Application No. 63/422,671, filed on Nov. 4, 2022, which is incorporated by reference herein in its entirety."

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

Trademarks used in the disclosure of the invention, and the applicants make no claim to any trademarks referenced.

BACKGROUND OF THE INVENTION

1) Field of the Invention

The invention relates to the field of presentations and slide management.

2) Description of Related Art

Currently the state of the art requires users to spend many hours cobbling together slide decks for sales pitches, conferences, and board meetings. The time spent pulling together graphics, statistics, and quotes from disparate sources, hunting through folders, trying to anticipate your audience's interest is time consuming and costly. On average, a person spends about five hours preparing a presentation and the average presentation last approximately thirty minutes.

This process is replicated millions of times each day resulting in millions of manhours being spent creating the slide decks for these presentations.

The problem is made more dire because the users producing these slides in many cases produce the same slides that have been made by other members of their organization which compounds the time wasted on slide creation.

In particular there is a need for a solution to at least one of the aforementioned problems. For instance, there is a need for a system to catalog and rate the effectiveness of a slide.

BRIEF SUMMARY OF THE INVENTION

The instant invention in one form is directed to a system that allows a user to pull slides from a corporate slide library that has individual slides for every issue. For example, the slides could be stored under the following topics: who you are, what you do, how you do it, why you do it, or any other system of segregating the slides that the organization desires. The system allows the user to read and react to your clients' needs on the fly with valued documentation that is part of the corporate library and contains ratings with respect to the effectiveness of the slide.

In a first implementation of the invention, is a database of slides which is accessible via a company wide database that will save the organization time by reusing all of the assets and the database records of the slides are used in the various presentations that have been created by the company team members. The system provides the users with quality information, so they know which slides are most effective. The slides can be constantly revised and update to make the content more relevant and so each slide is made better and better for their entire organization. However, the instant invention has the added benefit that the organization will be able to follow conversations, respond at critical moments, and reinforce the message of each slide thereby greatly increasing the chances of achieving a mutually beneficial ending.

In another aspect of the invention the instant invention creates the genealogy of the slide. There is a similar parent-child relationship within the instant invention database which tracks the author and various users who have incorporated the slides in their presentations. This creates a direct and traceable genealogy for the slide and makes it easy to provide global updates for the slide and refresh all the presentations that use the slide.

The system can also incorporate an access barcode or QR code in the slide so that the slide can be identified quickly from scanning the access barcode or QR code and then accessing the database to download and access the slide.

The system also provides a similar service for complete presentations. The presentations are categorized and stored with the information about the presentation such as topic, who presented to, precentors, presentation time required, slide notes and access barcode or QR code.

These and other objects, features, and advantages of the present invention will become more readily apparent from the attached drawings and the detailed description of the preferred embodiments, which follow.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION

Figure 1:
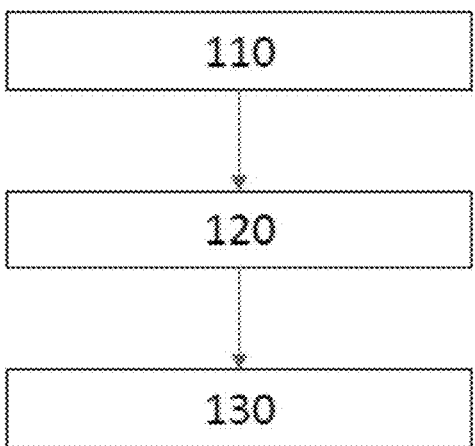
FIG. 1 there is shown a flow chart of the instant invention.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art however that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token however, no single feature or features of any described embodiment should be considered essential to every embodiment of the invention, as other embodiments of the invention may omit such features.

In this application the use of the singular includes the plural unless specifically stated otherwise and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure be considered as an example of the principles of the invention and not intended to limit the invention to the specific embodiments shown and described.

The terms presentations and slides are used interchangeably in the specification to mean at least one document that forms a presentation given by a user of the instant invention.

The terms enterprises, individual enterprises and companies are used interchangeably in the specification to mean an organization that uses the instant invention.

The terms user, individual and person are used interchangeably in the specification to mean a person that uses the instant invention.

The term access barcode or QR code are used interchangeably to mean a code that provides the location of a particular slide or presentation within the storage system of the instant invention.

The term presentation as used in the specification is a collection of slides.

The instant invention is a system to help companies create, utilize, rank and track slides and or presentations used by their staff. Companies and individual enterprises rely on presentations to motivate action and inform employees, distributors, clients and investors. The context of slides is universal; they are used for sales, marketing, fund raising, research, project management, human resources, training, company history, etc. One slide is often used multiple times, in many different presentations for different purposes. The slide and the particular notes used in a presentation can be beneficial to a new user and the instant invention provides a user with the slide, the history and information regarding the slide.

The instant invention uses slide tracking to follow a slide, through its different generations providing data that includes, but is not limited to date, time, user, file name, context. Slide genealogy is the visual mapping of that data, so users can easily analyze the use and therefore, value of that slide, and the information contained within, to make forward going business decisions.

Companies and individual enterprises accumulate an exponential number of slides over time. The information regarding a slide and how the slide is used is important and can assist an presentation developer select the appropriate slide. The problem with current process include:

a. Is the same slide re-used by multiple employees or presenters in different presentations, at different times.

b. Do users of a slide make edits.

c. Do users of a slide use an exact duplicate.

d. Do users of a slide use the slide in a specific sequence to form a presentation.

e. Does the slide documentation contain records as to when and where a slide was used or created.

f. was the slide ever used.

g. If a slide is used multiple times, in multiple scenarios, is there a method to measure the use and impact.

h. There is no visual record of edits made to a slide.

i. There is no systematic means to edit and re-use slides for new scenarios.

Often enterprises rely on a few, select, presentation gurus, whose information is primarily anecdotal and based on their subjective memory. The solution: is to create a slide genealogy application of the instant invention.

The slide genealogy application of the instant invention tracks the journey of a slide, and its many generations over time. The instant invention creates a log of the slide uses starting at the first iteration of the slide and this is defined as a parent slide. Each time that parent slide is copied into a new presentation, a child slide is created, and the presentation information recorded in the log. The child slide is a duplicate of the parent. The slide genealogy application of the instant invention provides logs of usage for each slide, as well as a visual map of the complete family of slides, with all generations—i.e., parent slide, children slide, grandchildren, etc.

Following is a list of data that slide genealogy application of the instant invention tracks and displays and is collected by the slide genealogy application instant invention:

a. Parent slide i. date and time stamp ii. barcode or QR code assigned to the slide for easy identification and tracking.

b. User created—user id and password—is also captures the Internet protocol address (IP address) to be used to confirm the user and checks the IP address against a list of sanctioned IP addresses stored in the data base to ensure that the individual is authorized. The sanctioned IP address limits the access to the database to only those individuals authorized to access the slide database.

i. PowerPoint presentation file where it appears.

ii. Slide number sequence within that presentation c. Children slides derived from parent i. date and time stamp ii. user created iii. PowerPoint presentation(s) where it appears iv. Slide number sequence within that presentation d. When a slide is edited, it becomes a new parent, and a new family is created. Business Intelligence for slide includes:
  i. What was the mode of presentation delivery on a particular occasion i.e., online meeting, in-person meeting, etc.
  ii. Which version of a specific slide relates to a specific outcome e.g., winning a sales deal, presentation to Congress, etc.

The instant invention providing a detailed slide genealogy is a visual reporting tool that provides the above information in an easy-to-consume way.

The instant invention slide tracking provides the elements for slide genealogy data.

Methodology for slide tracking.

Within the instant invention the definition of slide tracking is:

a. Slide tracking logs and stores the data of a specific slide through space and time. For example, the slide is used in a conference in Las Vegas on a particular date, that data should be captured. Slide Tracking is only possible if each slide has its own unique identity. Therefore, the instant invention assigns a unique identifier to the slide deck and to each slide that is unique to that slide deck. Slides that come from another slide deck keep their unique identifier from their original slide deck. The unique identifiers can be stored as data in the database and the data can be incorporated into the slide as meta data, a barcode or a QR code.

b. The instant invention assigns a tracking ID.

c. The instant invention maintains each slide's identity through a tracking ID—a 10-digit number—unique to each slide. The instant invention also identifies different "slide activities" for which a slide is tracked. Slide activities are, but not limited to slide activities such as—presenting, sharing, liking, commenting, emailing, viewing, editing, updating, re-use in a new presentation, re-use in a new video, etc.

The following is a list of actions, properties, and other data relevant to a slide that is tracked by the instant invention:

a. Activity
  i. View, re-use in a new presentation, downloaded in a presentation, edit, share in link, present live, comment, like, edit, delete b. date and timestamp c. user id—the instant invention user id of the person who performed did the activity, and also captures the Internet protocol address (IP address) to be used to confirm the user and checks the IP address against a list of sanctioned IP addresses stored in the data base to ensure that the individual is authorized.

d. GPS location (latitude/longitude)

e. device make (PC, Android, iPhone, etc.)

f. device MAC address g. IP address h. The instant invention app type (web app, windows app, iOS app, etc.)

i. Custom fields—these are the fields in the database that a customer (user) can define on her own to track, in addition to the other things tracked by the instant invention
  i. An example of custom fields can best be illustrated with the following example:
    a pharmaceutical company creates a custom field for their product ID and they associate each slide with a specific product. This way, in reports, they can correlate a slide with a specific product.

Elaborating with respect to each of the above attributes to explain what exact data is captured.

Methodology for Slide Genealogy:

a. The instant invention identifies each slide with a unique alpha numeric or numeric ID.

b. With each edit, the instant invention saves a new version of each slide, along with:
  i. a unique alpha numeric or numeric ID.
  ii. timestamp of when it was edited.

c. User id of the person who edited it and also captures the Internet protocol address (IP address) to be used to confirm the user and checks the IP address against a list of sanctioned IP addresses stored in the data base to ensure that the individual is authorized, GPS location is checked against a list of authorized GPS locations. The GPS location also allows the instant invention to arrange the storage, so the presentations and slides are stored to allow quick access by location. For example, when the instant invention is used by a client that has operations in many different countries the slides may be in different languages and the product branding or marketing is different. The GPS location allows the instant invention to organize the presentations and slides by the countries identified by their GPS location of use.

d. The instant invention stores all presentations a specific version of a slide was added to along with:
  i. when (timestamp) it was added.
  ii. who added it (user id) and IP address.

e. The instant invention tracks the "presentation events" and store the following information.
  i. Which presentation was used (presentation id)
  ii. Who presented it (user id) and IP address.
  iii. When did this event occur (timestamp)
  iv. Mode of the event (online, in-person)
  v. Event type (sales pitch, employee orientation, etc.)
  vi. GPS location stored in the GPS id, and it is used to identify the target geographical area or region that the slide is intended for.

f. Data model explained.

g. The algorithm explained to generate the genealogy of a slide.

The instant invention slide genealogy can be used to provide visual mapping and hard data for which corporate marketers/executives can use based on which slides are used and frequency. This information of slide utilization can be applied to business intelligence to make forward content decisions.

The instant invention provides the user company with visual business intelligence. The information can help a business streamline and refine their message also that the entire organization presents the same message. This is important for ensuring that customers, investors, employees, shareholders, and other stakeholders all get the same information.

The instant invention slide tracking algorithm provides business intelligence and insights as to which slides were used, how often and in what context. This data serves as the basis/proof/reasoning for content decisions such as: which slides require updating or deletion. Slides that are continually updated and curated provide a more efficient way for users in the field to create and customize presentations for their own task. Gaining user insight into their use and interaction of slides allows users and company executives to make better decisions.

The instant invention provides the users with a number of benefits:

a. The instant invention slide genealogy improves presentation quality.

b. The instant invention slide genealogy improves brand compliance.

c. The instant invention slide genealogy improves message compliance.

d. The instant invention slide genealogy promotes repetition.

i. Repetition and consistency provide a clear message and improves the branding message thereby increasing the branding effectiveness.

The instant invention also provides multiple benefits to the user and the company using the instant invention than be summarized as:

1. Slide tracking.

2. Slide tracking data analytics for effective communications.

3. Integration with other tools.

1. Slide tracking:

a. Slide tracking is about tracking the data of a specific slide through space and time. For example, a slide is used in a conference in Las Vegas on a particular date, that data should be captured. Slide tacking requires that each slide be identifiable and cataloged. Tracking is only possible if each slide has its own unique identity, and that unique identifier is stored in a secure repository.

The instant invention tracks the slide by:

Assigning a tracker ID. To accomplish this the instant invention. The instant invention maintains each slide's identity through a tracking ID that can be any length alpha numeric or numeric identifier. For the purposes of discussion, the identifier could be a 10-digit number. The 10-digit number will be unique to each slide. The instant invention also identifies different "slide activities" that numeric tracked by the instant invention database. Slide activities are, but not limited to presentation used in, presenting, sharing, liking, commenting, emailing, viewing, editing, updating, re-use in a new presentation, re-use in a new video, etc.

A significant question due to the flexibility of the instant invention is what should an organization track with respect to the slides and presentations?

Whenever any of the above listed activities happen to the tracked slide, such as use and or modification, the following data information is logged and tracked, and data saved in the database:

a. Specific activity. The instant invention captures what activity happened to the slide.

b. date and timestamp.

c. User id—the instant invention user id of the person who performed or did the activity. The instant invention also captures the Internet protocol address (IP address) to be used to confirm the user is authorized to use the instant invention and checks the IP address against a list of sanctioned IP addresses stored in the data base to ensure that the individual is authorized.

d. location (latitude/longitude). The instant invention does this to limit the ability for the instant invention to be hacked by an unauthorized user. Sanction IP addresses are kept in the database and any attempts to access the database from a no sanctioned location is denied. The instant invention can use degrees, minutes and second location information but to provide the simplest location verification scheme the instant invention normal method of comparison is the compare only the degrees and minutes. This provides a significant level of flexibility considering that a degree of arc of latitude is approximately 111 km (69 miles) and a degree of longitude at the Equator is about 111.32 km (69.17 miles) and at the poles, 0.

e. device make (PC, Android, iPhone, etc.).

f. device MAC address.

g. IP address. This is compared to a sanctioned list of IP addresses to add a level of security above the standard login id and password.

h. The instant invention application captures the type of application that is used (web app, windows app, iOS app, etc.).

i. Custom fields—these are the fields in the database that a customer (user) can define on her own to track, in addition to the other things tracked by the instant invention.

j. An example of how what is tracked in a real-world application of the instant invention is a pharmaceutical company creates a custom field for their product ID and they associate each slide with a specific product. This way, in reports, they can correlate a slide with a specific product.

2. Slide tracking data analytics for effective communications:

a. As used in within the description of the instant invention effective communication can be interpreted using the following:

i. Companies need effective communication throughout the organization to accomplish their objectives—from better selling, to better recruiting and everything in between. Companies want consistency of their brand in their presentations and other documents including the use of brand logos, fonts in presentations, colors, etc. Companies also need to ensure that there's consistency of message among their vast sales teams, legal, Human resources, etc.

b. The instant invention provides the potential for users to utilize tracking data to improve communication:

i. Once slide tracking is enabled, the instant invention uses the tracking data to provide insights related to the effectiveness of communication within the company. The instant invention captures and stores information and allows management to receive insights such as:

1. Are the salespeople delivering the same message about a product across geographies?

2. Are they up to date on the latest positioning message designed by the marketing department?

3. Which slides correlate to higher sales?

4. Which slides generate most customer interest?

c. The instant invention provides the genealogy of a slide that allows the organization to visualize a new kind of insight with respect to their presentations and the specific slide effectiveness. This information is captured and created by the instant invention and the instant invention refers to this as the genealogy of a slide.

For example, if you have a slide that provides an overview of your company, and in that slide, you refer to yourself as "an international company." For rebranding purposes, company leaders decide to change that phrase to "a global company." This change needs to be disseminated throughout all the slides that need to have the wording updates. The instant invention has to roll out this change and update the phrase to the entire organization.

For example, to accomplish the change in terminology from "an international company" to "a global company." The change needs to be made to the parent slide. The instant invention knows that the overview slide has been used 225 times in presentations throughout the organization in all kinds of contexts and for numerous reasons. That means there are 225 child slides contained within various presentations. However, the instant invention automatically updates all the other instances of "an international company" to "a global company." as soon as the change to the parent slide is made and throughout the database of slides "an international company" becomes "a global company," the text is updated in every child slide, and every user gets a notification about the update.

At the same time, every parent slide maintains an ancestry or genealogy of data that can be accessed with analytics and reporting, and that information becomes critical business intelligence about what is working and what is not. You know which slides are being used, when, where, and by whom, which slides are being updated and which are not, which slides get reused frequently and which do not. All of this information creates a knowledge base unlike any product available for slide and presentation management. As the genealogy of the corporation or user slides becomes clearer to the organization, you gain a clear understanding of how your global organization is communicating, and you can adjust accordingly.

3. Integration with other tools:

To make communications better for a company that uses various other software. The instant invention integrates with different platforms. Each of the following represents a type of platform that the instant invention can integrate with a. Web meeting tools like Zoom, Teams, Google Meet, etc.

b. Describe a use case c. Displays like Apple TV, Google Chromecast, etc.

d. CRMs like Salesforce e. Analytics software like Tableau, PowerBI, etc.

The instant invention tracks data about each slide over time to derive actionable insights that can be used to measure the quality of communications of a company and have a better opportunity to make them more effective.

As one can envision the instant invention is a presentation management system comprising:

a Slide Tracking module;

b. Slide tracking data analytics module; and c. Integration module; and a. the slide tracking module having a presentation deck id sub module and a slide id sub module and the deck id sub module assigns a deck id to the presentation deck and slide id to at least one slide in the presentation deck and then captures a presenter id, event timestamp, a mode id, event id and GPS id and the Slide Tracking module stores the a presentation deck with the deck id, the slide id to at least one slide and stores the presenter id, the event timestamp, the mode id, the event id and the GPS information in a database associated with the presentation deck. The GPS information is a powerful tool in that it helps determine that a user is a valid user, and the GPS location also allows the instant invention to arrange the storage, so the presentations and slides are stored to allow quick access by location. For example, when the instant invention is used by a client that has operations in many different countries the slides may be in different languages and the product branding or marketing is different. The GPS location allows the instant invention to organize the presentations and slides by the countries identified by their GPS location of use.

Referring now to the drawings FIGS. 1-5, and more particularly to FIG. 1, there is shown a flow chart of how the instant invention works. The instant invention provides multiple benefits to the user and the company using the instant invention. These are captured in the modules slide Tracking 110, side tracking data analytics for effective communications 120 and Integration with other tools 130.

Figure 2:
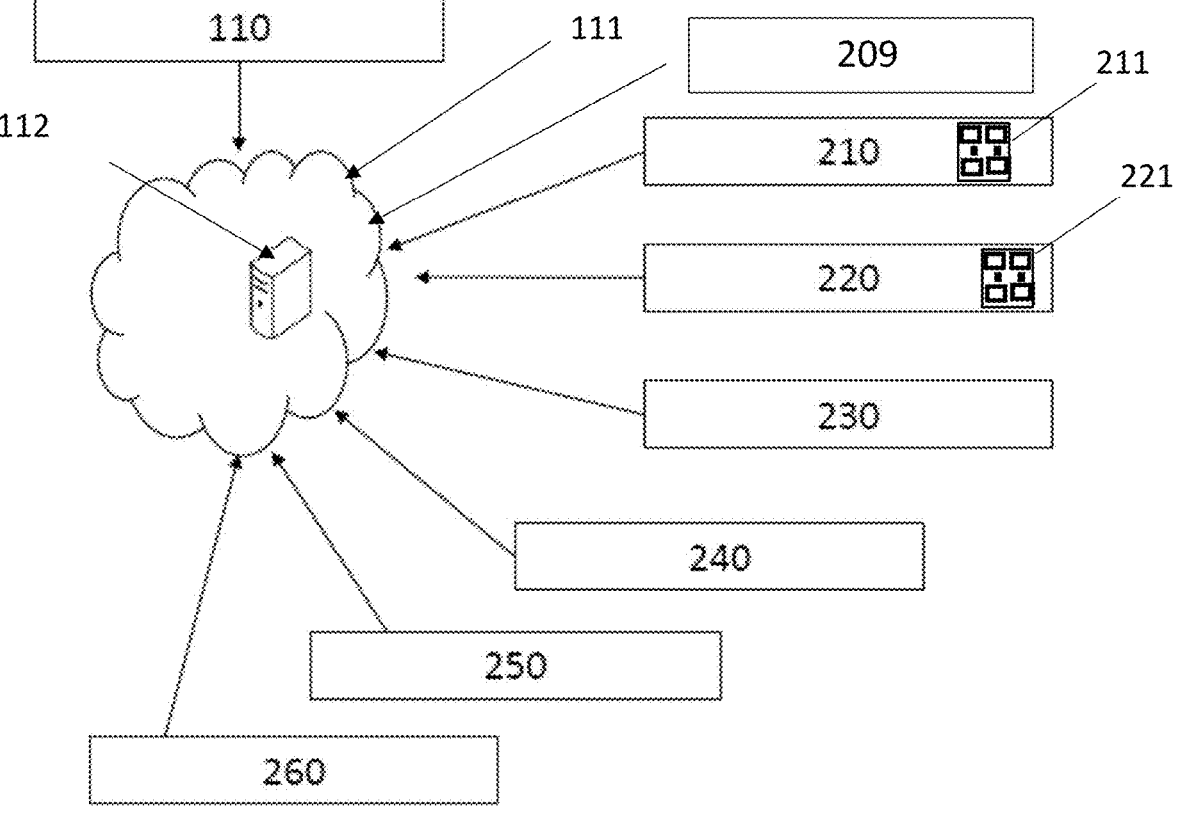
FIG. 2 there is shown the slide tracking module.

Referring to FIG. 2 the slide tracking 110 module is where the instant invention captures the presentation and slide information, and the instant invention assigns a unique identifier that can also be incorporated into a barcode or QR code 211 to the slide deck referred to as the deck id 210 and to each slide that is unique to that slide deck is assigned a slide id 220 that can also be incorporated into a barcode or QR code 221. For a new presentation, the instant invention creates an original deck id 210 and each slide is assigned a slide id 220. The presentation deck id 210 is associated in a database 112 in cloud 111 of the instant invention with who created it user id 209 and associated IP address, who presented it presenter id 220, when did this event occur timestamp 230 containing at least the month, day, year, and hour, mode of the event creating a mode id 240 (online, in-person), event type event id 250 (sales pitch, employee orientation, etc.) and GPS location GPS id 260 to identify the target geographical area or region that the slide is intended for. The GPS location can also be checked against a sanctioned GPS list to determine if the user is authorized to edit or create a slide or presentation. The user is also asked for their log in credentials that can include a user id, a user password and the IP address of the device being used to interface with the instant invention. If the IP address is not in the sanctioned list, then the user is denied access.

Figure 3:
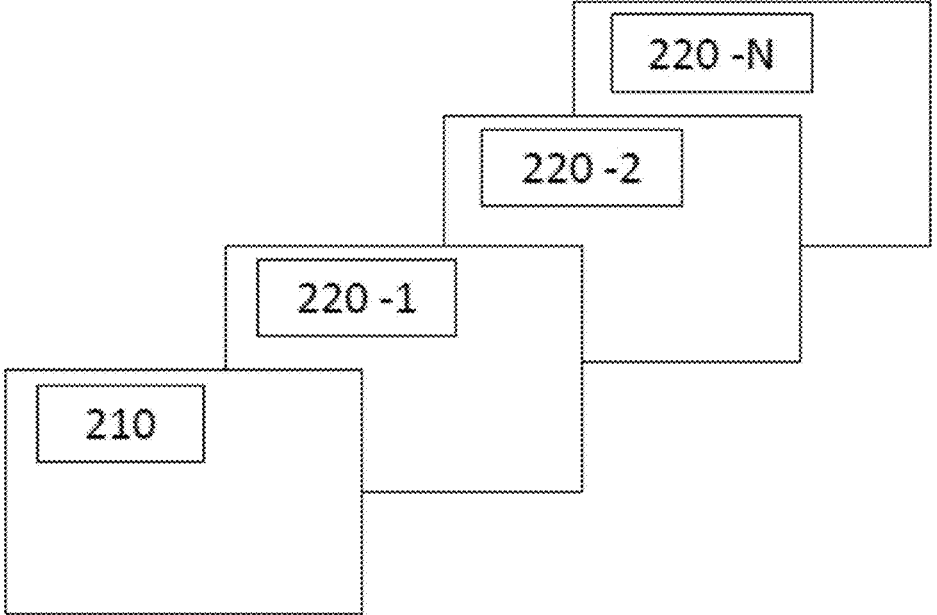
FIG. 3 there is shown a new slide presentation with deck id and unique slide ids.

Referring to FIG. 3 there is shown a new slide presentation with deck id 210 and to each slide that is unique to that slide deck is assigned a slide id 220-1 to 220-n.

Figure 4:
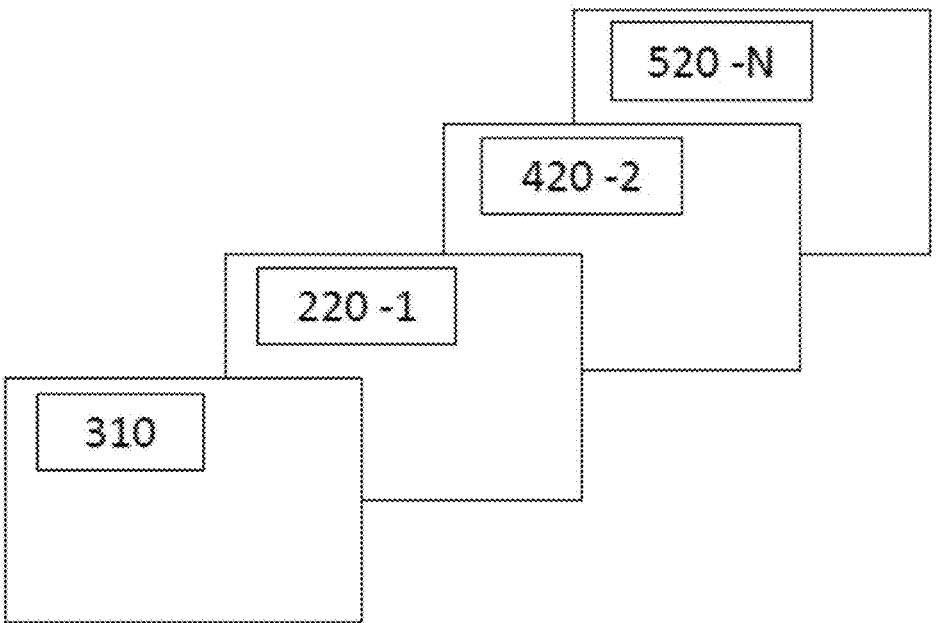
FIG. 4 there is shown a new slide presentation with deck id comprised of slides from more than one different deck.

Referring to FIG. 4 there is shown a new slide deck with deck id 310 comprised of slides having slide id 220-1 from deck id 210 and slide with slide id 320 from deck id 310 and slide id 420 from slide deck with deck id 410.

Figure 5:
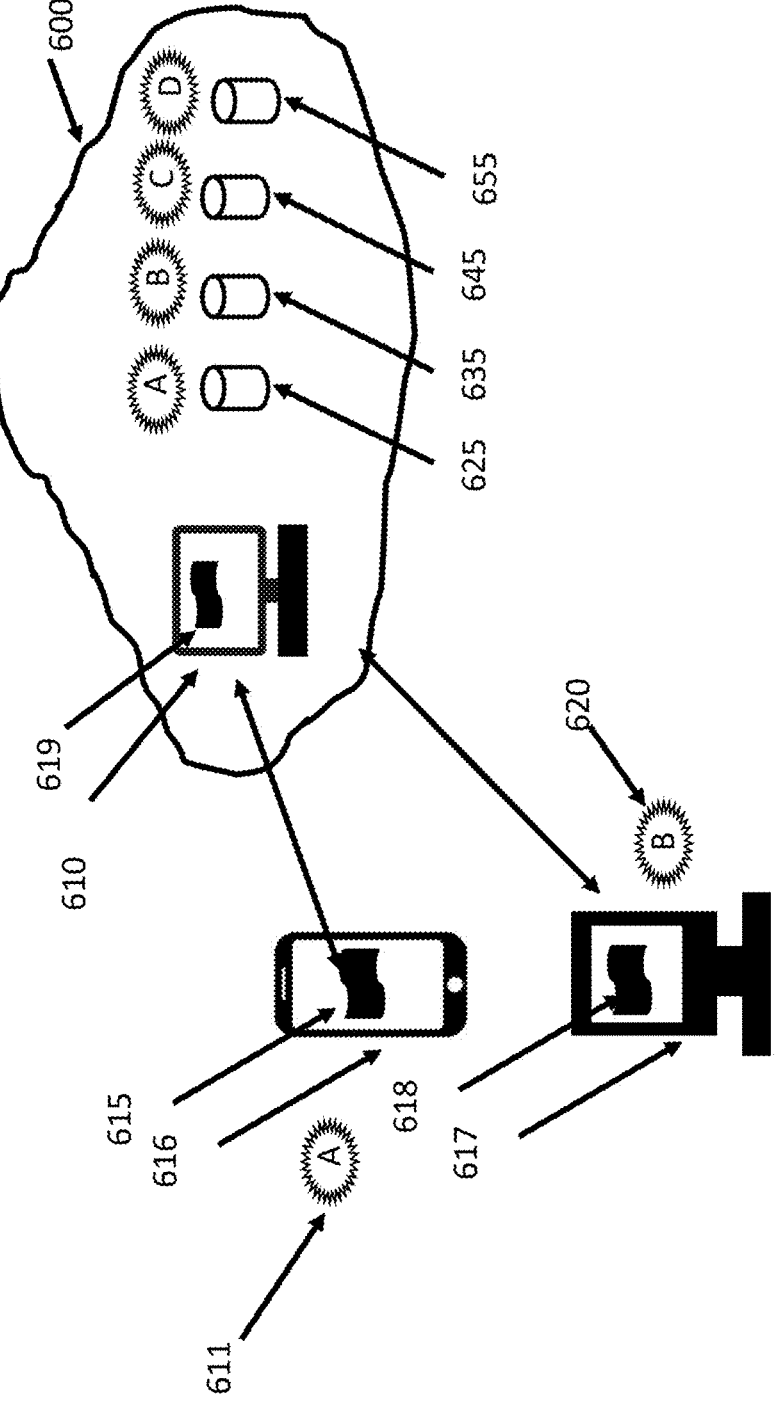
FIG. 5 there is shown an embodiment of the instant invention where the computerized system of the instant invention is located on a server and the server is in a cloud environment.

Referring to FIG. 5 there is shown an embodiment of the instant invention where the computerized system of the instant invention 619 is located on a server 610 and the server 610 is in a cloud environment. However, the system does not have to be located in the cloud and can be located in a networked environment where the network provides access to the instant invention.

The user device 616 has presentation 615 and associated GPS location 611 "A". The user device 617 has presentation 618 and associated GPS location 620 "B". If user device 616 or 517 makes a request from the server 610 and the instant invention 619 to view or modify presentation 618 or presentation 615 the server 610 and the instant invention 619 receives the user id, a user password, and the GPS location 620 "B" the device. This allows the instant invention 619 to access any files, presentation or slides needed based on the GPS information where the system stores files based on location, utilization, and creation. The files can be stored in the regional databases 625 associated with GPS location "A", regional databases 635 associated with GPS location "B", regional databases 645 associated with GPS location "C" or regional databases 655 associated with GPS location "D". While the FIG. 5 shows only 4 regional databases the instant invention envisions using as many as necessary to cover all the users' regions. The regions could be a state, Province, country, or continent.

Figure 6:
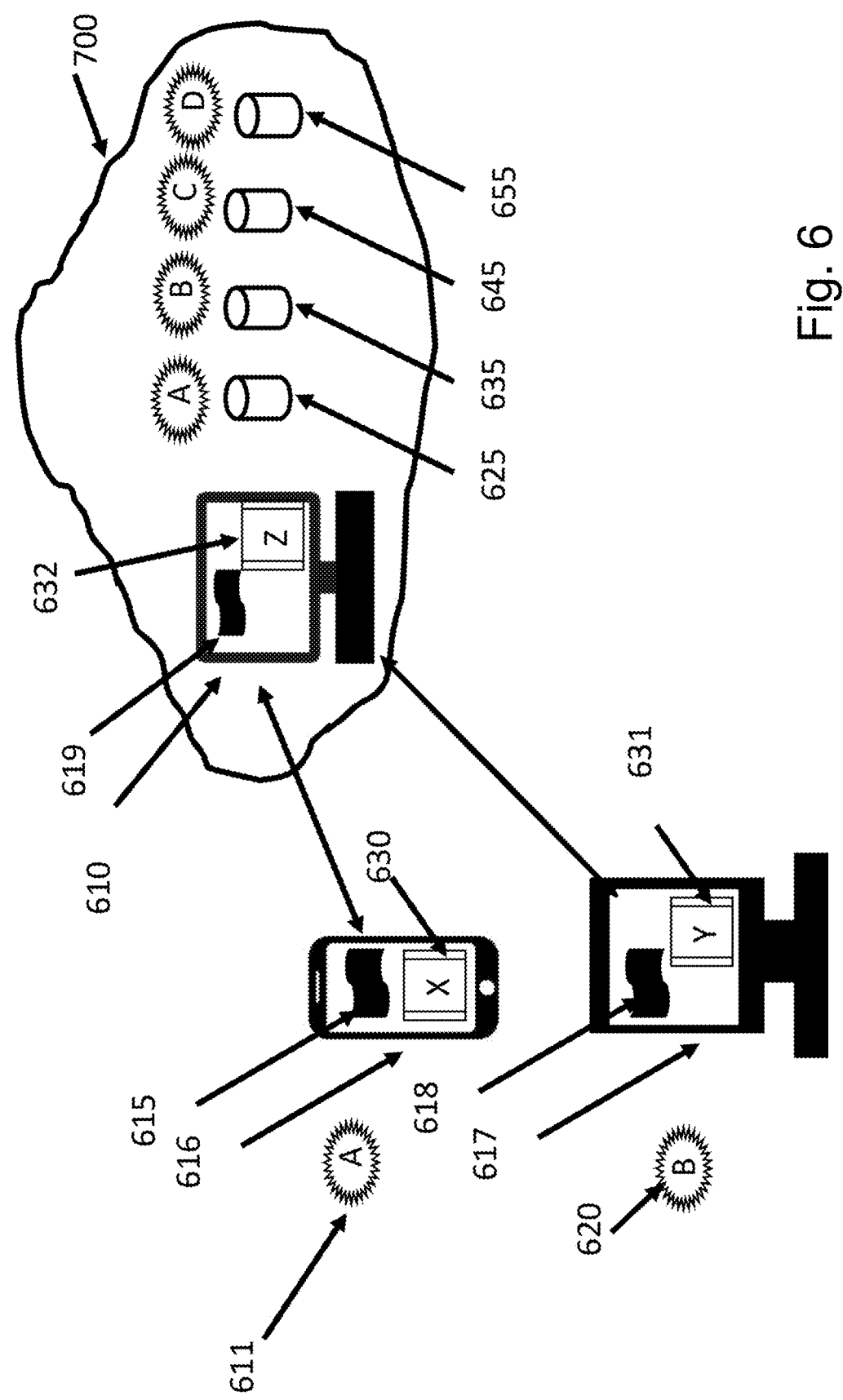
FIG. 6 there is shown an embodiment of the instant invention where the computerized system of the instant invention is located on a server and the server is in a cloud environment and the instant invention us the IP address as a method to provide increased security.

Referring to FIG. 6 there is shown an embodiment of the instant invention where the computerized system of the instant invention 619 is located on a server 610 and the server 610 is in a cloud environment. However, the system does not have to be located in the cloud and can be located in a networked environment where the network provides access to the instant invention.

The user device 616 has presentation 615 and associated GPS location 611 "A" and it has an associated IP address 630. The user device 617 has presentation 618 and associated GPS location 620 "B" and it has an associated IP address 631. If user device 616 or 517 makes a request from the server 610 and the instant invention 619 to view or modify presentation 618 or presentation 615 the server 610 and the instant invention 619 receives the user id, a user password, and the GPS location 620 "B" the device and the associated IP address 630 or 631.

The associated IP address 630 or 631 is then check against a sanctioned IP address list 632 on the server 610 and if the user id, a user password, and the GPS location 620 "B" the device and the associated IP address 630 or 631 can be verified and the IP address 630 or 631 are in the sanctioned IP address list 632 then the server allows access to the presentation databases 625, 635, 645 and 655.

This allows the instant invention 619 to access any files, presentation or slides needed based on the GPS information where the system stores files based on location, utilization, and creation. The files can be stored in the regional databases 625 associated with GPS location "A", regional databases 635 associated with GPS location "B", regional databases 645 associated with GPS location "C" or regional databases 655 associated with GPS location "D". While the FIG. 6 shows only 4 regional databases the instant invention envisions using as many as necessary to cover all the users' regions. The regions could be a state, province, country, or continent. Also, the system does not need to have a regional database storage system and can alternatively use on regional database 625 where all the slides and presentations are stored as shown in FIG. 2.

As disclosed when the instant invention uses the term slide, the term means all of your PowerPoint, or other presentation processing or creation tool and these files can include the presentation, the slides, every single piece of content in your library—pictures, video, charts, graphs, white pages, PDFs, everything—because every piece of content is automatically formatted as a slide, ready to present. Indeed, we could use the terms "file" and "slide" interchangeably here.

Put another way, the instant invention is a content management system for presentations in which every file is part of a larger family with a parent-child relationship. The very purpose of creating child slides every time someone uses the parent slide in a presentation is precisely so you have analytics about which slides are being used and how effective they are.

In some embodiments the method or methods described above may be executed or carried out by a computing system including a tangible computer-readable storage medium, also described herein as a storage machine, that holds machine-readable instructions executable by a logic machine (i.e. a processor or programmable control device) to provide, implement, perform, and/or enact the above-described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Since many modifications, variations, and changes in detail can be made to the described embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

In addition, the present invention has been described with reference to embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of manufacture, shape, size, or materials which are not specified within the detailed written description or illustrations contained herein are considered within the scope of the present invention.

Insofar as the description above and the accompanying drawings disclose any additional subject matter that is not within the scope of the claims below, the inventions are not dedicated to the public and the right to file one or more applications to claim such additional inventions is reserved.

Although very narrow claims are presented herein, it should be recognized that the scope of this invention is much broader than presented by the claim. It is intended that broader claims will be submitted in an application that claims the benefit of priority from this application.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A presentation management system comprising:
a tangible computer-readable storage medium comprising a storage machine that holds machine-readable instructions;
a logic machine comprising one or more processors configured to execute the machine-readable instructions;
a slide tracking module implemented via the logic machine and storage machine, the slide tracking module configured to assign a slide id and a presentation deck identifier to each slide of a presentation deck stored in a database, and to incorporate a barcode or QR code for slide identification, wherein the barcode or QR code, upon scanning, is configured to provide access to download and access said slide,
wherein the slide tracking module is configured to capture, track, and store slide activity data, including a timestamp, a user identifier, an IP address, a device MAC address, and GPS id;
an access verification module implemented via the logic machine and storage machine, the access verification module configured to authenticate user access by comparing the captured IP address against a sanctioned IP address list stored in the database, wherein access to the database is denied when the IP address is not present in the sanctioned IP address list; and
a genealogy module implemented via the logic machine and storage machine, configured to generate and maintain a log of slide use frequency and slide iterations by logging a parent slide and corresponding child slides upon reuse or modification, wherein each child slide is created when a parent slide is copied into a new presentation and the presentation information is recorded in the log; and
automatically propagate changes made to the parent slide to all corresponding child slides stored across the database by identifying each child slide through the logged parent-child relationship, thereby enabling global updates and visual mapping of slide genealogy.

2. The presentation management system of claim 1, wherein said presentation deck identifier is written to the presentation deck stored in said database identified with said GPS id and said slide id is written to at least one slide in said at least one presentation deck stored in said database identified with said GPS id at least one presentation deck and said slide id.

3. The presentation management system of claim 1, wherein at least one user access said at least one said presentation deck stored in said database identified with said GPS id and said at least one user access said at least one presentation deck and changes said at least one slide to create a child at least one slide and said presentation management system stores said child at least one slide in said database identified with said GPS id and stores said at least one slide in said database identified with said GPS id.

4. The presentation management system of claim 3, wherein said at least one user access said at least one presentation deck stored in said database identified with said GPS id and copies said at least one slide of the presentation deck to create a child at least one slide and at least one user creates a new said at least one presentation deck and stores said child at least one slide in said new said at least one presentation deck and said presentation management system stores a said child at least one slide in said new at least one presentation deck in said database identified with said GPS id and said presentation management system writes a new deck id to said new at least one presentation deck stored in said database identified with said GPS id and said presentation management system writes a new slide id to said child at least one slide in said at least one presentation deck stored in said database identified with said GPS id.

5. The presentation management system of claim 4, wherein said at least one user access said at least one presentation deck stored in said database identified with said GPS id and copies said at least one slide to create a child at least one slide and at least one user creates a new at least one presentation deck and stores said child at least one slide in said new said at least one presentation deck and said presentation management system stores a said child at least one slide in said new at least one presentation deck in said database identified with said GPS id and said presentation management system writes a new deck id to said new at least one presentation deck stored in said database identified with said GPS id and said presentation management system writes a new slide id to said child at least one slide in said at least one presentation deck stored in said database identified with said GPS location.

6. The presentation management system of claim 1, wherein the access verification module is configured to authenticate user access by comparing the stored IP address and GPS location against a pre-defined database of authorized credentials.

7. The presentation management system of claim 1, further comprising interfacing with an integration module configured to communicate with one of external web meeting tools, display devices, CRM systems, or analytics software platforms and the integration module implemented via the logic machine and storage machine, the integration module configured to interface with external communication and presentation management applications for updating, retrieving, and analyzing slide utilization data.

8. A presentation management system for use by at least one user comprising: a tangible computer-readable storage medium comprising a storage machine that holds machine-readable instructions; a logic machine comprising one or more processors configured to execute the machine-readable instructions; a slide tracking module implemented via the logic machine and storage machine, the slide tracking module configured to manage a plurality of slide files stored as computer files in a database, wherein each slide file comprises a slide id and a presentation deck identifier incorporated as metadata embedded within the slide file, and to incorporate a barcode or QR code for slide identification, the slide tracking module further configured to capture, track, and store slide activity data, including a timestamp, a user identifier, an IP address, GPS id, and a product ID field that correlates the slide file to a specific product associated with the product ID; a genealogy module configured to generate and maintain a log of slide use frequency and slide file iterations by logging a parent slide file and corresponding child slide files upon reuse or modification, wherein each child slide file is created when a parent slide file is copied into a new presentation and the presentation information is recorded in the log; automatically propagate changes made to the parent slide file to all corresponding child slide files stored across the database by identifying each child slide file through the logged parent-child relationship using the unique identifier metadata, thereby modifying the computer file content of each child slide file to reflect the parent slide file changes and enabling global updates across the plurality of slide files and generate visual mapping of slide file genealogy displaying the parent-child relationships; and an access verification module configured to authenticate user access by comparing the IP address and GPS location recorded by a data logging module, implemented via the logic machine and storage machine, against a pre-defined database of authorized credentials, wherein access to the slide files stored in the database is denied when the IP address is not present in a sanctioned IP address list.

9. The presentation management system of claim 8, wherein said deck id is written to said at least one presentation deck stored in said database identified with said GPS id and said slide id is written to at least one slide in said at least one presentation deck stored in said database identified with said GPS id at least one presentation deck and said slide id.

10. The presentation management system of claim 8, wherein at least one user access said at least one said presentation deck stored in said database identified with said GPS id and said at least one user access said at least one presentation deck and changes said at least one slide to create a child at least one slide and said presentation management system stores a-said child at least one slide in said database identified with said GPS id and stores said at least one slide in said database identified with said GPS id.

11. The presentation management system of claim 10, wherein said at least one user access said at least one presentation deck stored in said database identified with said GPS id and copies said at least one slide to create said child at least one slide and said at least one user creates a new at least one presentation deck and stores said child at least one slide in said new said at least one presentation deck and said presentation management system stores a-said child at least one slide in said new at least one presentation deck in said database identified with said GPS id and said presentation management system writes a new deck id to said new at least one presentation deck stored in said database identified with said GPS id and said presentation management system writes a new slide id to said child at least one slide in said at least one presentation deck stored in said database identified with said GPS location.

12. The presentation management system of claim 8, further comprising an integration module implemented via the logic machine and storage machine, the integration module configured to interface with external communication and presentation management applications for updating, retrieving, and analyzing slide utilization data.

13. A presentation management system comprising: one or more processors;
    a tangible computer-readable storage medium storing instructions that, when executed by the one or more processors, cause the one or more processors to perform operations comprising:

implementing a slide tracking module having a presentation deck id sub module and a slide id sub module, wherein the deck id sub module assigns a deck id to the presentation deck and the slide id sub module assigns a slide ID to at least one slide in the presentation deck stored in a database;
    incorporating a barcode or QR code for slide identification;
    capturing a presenter id, an event timestamp, an event id, and GPS id, wherein the GPS id is used to identify the target geographical area or region that the slide is intended for;
    storing the presentation deck with the deck id, the slide id to at least one slide, and storing the presenter id, the event timestamp, the event id and the GPS id in the database associated with the presentation deck;
    checking the GPS id location against a sanctioned GPS list to determine if a user is authorized to edit or create a slide or presentation, wherein the presentation management system is configured to arrange storage so the presentations and slides are stored for quick access by location;
    receiving user log in credentials including a user id, a user password and an IP address of a device being used to interface with the presentation management system;
    denying access if the IP address is not in a sanctioned list;
    generating and maintaining a log of slide use frequency and slide iterations by logging a parent slide and corresponding child slides upon reuse or modification;
    automatically updating the corresponding child slides based on changes made to the parent slide; and
    providing a visual map of slide genealogy based on relationships between the parent slide and the corresponding child slides.

14. The presentation management system of claim 13, wherein the operations further comprise:
    capturing a mode id that records a mode of a presentation event, wherein the mode id indicates whether the presentation was delivered online or in-person;
    storing the mode id in the database in association with the presentation deck;
    correlating the mode id with slide activity data to determine which version of a specific slide relates to a specific outcome based on the mode of presentation delivery; and
    generating analytics reports that provide insights related to the effectiveness of communication based on the mode id.

15. The presentation management system of claim 13, wherein the operations further comprise:
    interfacing with an integration module configured to communicate with one of external web meeting tools, display devices, CRM systems, or analytics software platforms.

16. The presentation management system of claim 13, wherein the visual mapping of slide genealogy comprises:
    generating a visual reporting tool that displays the complete family of slides including all generations comprising the parent slide, children slides, and grandchildren slides;
    displaying logs of usage for each slide within the visual map; and
    providing visual business intelligence data including which slides are being used, when the slides were used, where the slides were used, and by whom the slides were used.

17. The presentation management system of claim 13, wherein the operations further comprise:

capturing a device make identifier indicating a type of device used to access said slide, wherein the device make identifier comprises at least PC, Android, or iPhone;

capturing a device MAC address of the device being used to access said slide;

capturing an application type identifier indicating the type of application used to access said slide, wherein the application type identifier comprises at least web app, windows app, or iOS app; and storing the device make identifier, the device MAC address, and the application type identifier in the database in association with the slide activity data.

18. The presentation management system of claim 13, wherein the operations further comprise:

storing the presentation deck in a plurality of regional databases, wherein each regional database is associated with a GPS location identifier;

storing the presentation deck in a corresponding regional database based on the captured GPS id location, thereby organizing presentations and slides by geographic region;

providing location-based retrieval of presentations and slides from the plurality of regional databases.

\* \* \* \* \*